United States Patent [19]
Klein

[11] Patent Number: 6,129,413
[45] Date of Patent: Oct. 10, 2000

[54] POWERED DUAL PANEL SUNROOF

[75] Inventor: George W. Klein, Dearborn Heights, Mich.

[73] Assignee: ASC Incorporated, Southgate, Mich.

[21] Appl. No.: 08/969,905

[22] Filed: Nov. 13, 1997

[51] Int. Cl.$^7$ .................................................. B60J 7/047
[52] U.S. Cl. ...................... 296/220.01; 296/91; 296/214; 296/216.08; 296/222; 296/223
[58] Field of Search ............................. 296/91, 214, 211, 296/215, 216.07, 216.08, 220.01, 222, 223, 221, 218

[56] References Cited

U.S. PATENT DOCUMENTS

| | | | |
|---|---|---|---|
| 4,159,144 | 6/1979 | Ehlen et al. | 296/216.08 |
| 4,185,868 | 1/1980 | Kaltz et al. | |
| 4,339,145 | 7/1982 | Bott et al. | 296/91 |
| 4,420,184 | 12/1983 | Kaltz. | |
| 4,441,752 | 4/1984 | Buehrig | 296/91 X |
| 4,556,835 | 12/1985 | Vogel et al. | |
| 4,566,730 | 1/1986 | Knabe et al. | |
| 4,601,091 | 7/1986 | Grimm et al. | |
| 4,601,512 | 7/1986 | Boots. | |
| 4,619,480 | 10/1986 | Motoyama et al. | |
| 4,626,023 | 12/1986 | Lutz. | |
| 4,630,860 | 12/1986 | Fuerst et al. | |
| 4,643,478 | 2/1987 | Boots. | |
| 4,647,106 | 3/1987 | Furst. | |
| 4,664,439 | 5/1987 | Schaetzler et al. | |
| 4,671,564 | 6/1987 | Sumida et al. | |
| 4,679,846 | 7/1987 | Lux et al. | |
| 4,684,169 | 8/1987 | Igel et al. | |
| 4,699,421 | 10/1987 | Schaetzler et al. | |
| 4,709,959 | 12/1987 | Paerisch et al. | |
| 4,746,165 | 5/1988 | Fuerst et al. | |
| 4,749,227 | 6/1988 | Bienert et al. | |
| 4,811,985 | 3/1989 | Kruger et al. | |
| 4,852,938 | 8/1989 | Hirshberg et al. | |
| 4,869,548 | 9/1989 | Nagata et al. | |
| 4,883,311 | 11/1989 | Kohlpaintner et al. | |
| 4,910,445 | 3/1990 | Borrmann. | |
| 4,911,496 | 3/1990 | Fuerst. | |

(List continued on next page.)

FOREIGN PATENT DOCUMENTS

| | | |
|---|---|---|
| 0 290 106 | 11/1988 | European Pat. Off. . |
| 1257321 | 2/1961 | France . |
| 2 234 852 | 1/1972 | Germany . |
| 2 318 391 | 10/1974 | Germany . |
| 19 46 161 | 1/1978 | Germany . |
| 36 03 314 A1 | 8/1987 | Germany . |
| 38 02 379 A1 | 8/1988 | Germany . |
| 38 22 258A1 | 3/1989 | Germany . |
| 38 13 049 A1 | 11/1989 | Germany . |
| 38 40 119 A1 | 5/1990 | Germany . |
| 39 00 361 A1 | 7/1990 | Germany . |
| 41 24 505 A1 | 10/1992 | Germany . |
| 58-218423 | 12/1983 | Japan . |
| 3197232 | 8/1991 | Japan . |
| 5-24437 | 2/1993 | Japan . |
| 406156085 | 6/1994 | Japan ..................................... 296/222 |
| 349172 | 5/1931 | United Kingdom .............. 296/220.01 |
| 2 047 636 | 12/1980 | United Kingdom . |
| 2 077 461 | 12/1981 | United Kingdom . |
| WO 94/25301 | 11/1994 | WIPO . |
| WO 96/01192 | 1/1996 | WIPO . |

OTHER PUBLICATIONS

"Ford 1973 Car Shop Manual", vol. 4 Body, Ford Marketing Corporation, pp. 46–10–01 through 46–10–8, 46–11–01 through 46–11–07.

"Saab Owners Workshop Manual", Haynese Publishing Group, 1981, 1986, 3 pages.

Drawing of ASC Sunroof (housing assembly) —Complete (750), Part No. C–49X5–0001–AXXX, (prior to Jun. 1995).

*Primary Examiner*—Dennis H. Pedder
*Attorney, Agent, or Firm*—Harness, Dickey & Pierce, P.L.C.

[57] ABSTRACT

A sunroof assembly for an automotive vehicle employs a fixed roof panel, a rear sunroof panel, a front sunroof panel, a rear sunshade, and a front sunshade. Another aspect of the present invention includes adjustable fastening together of the tracks. A modular sunroof assembly is also provided.

23 Claims, 19 Drawing Sheets

U.S. PATENT DOCUMENTS

| | | |
|---|---|---|
| 4,923,246 | 5/1990 | Takahashi et al. . |
| 4,941,706 | 7/1990 | Jardin . |
| 4,946,225 | 8/1990 | Jardin . |
| 4,978,165 | 12/1990 | Schreiter et al. . |
| 4,982,995 | 1/1991 | Takahashi et al. . |
| 4,995,665 | 2/1991 | Ichinose et al. . |
| 5,018,783 | 5/1991 | Chamings et al. . |
| 5,026,113 | 6/1991 | DiCarlo et al. . |
| 5,029,937 | 7/1991 | Yamamoto . |
| 5,044,222 | 9/1991 | Tanaka et al. . |
| 5,069,500 | 12/1991 | Reihl et al. . |
| 5,085,622 | 2/1992 | Kohlpaintner et al. . |
| 5,090,767 | 2/1992 | Schreiter et al. . |
| 5,104,178 | 4/1992 | Bienert . |
| 5,141,283 | 8/1992 | Omoto et al. . |
| 5,154,482 | 10/1992 | Hayashi et al. . |
| 5,184,870 | 2/1993 | Bauhof . |
| 5,197,779 | 3/1993 | Mizuno . |
| 5,248,278 | 9/1993 | Fuerst et al. . |
| 5,250,882 | 10/1993 | Odoi et al. . |
| 5,261,722 | 11/1993 | Staley et al. . |
| 5,288,125 | 2/1994 | Huyer . |
| 5,405,185 | 4/1995 | Cheron et al. . |
| 5,447,355 | 9/1995 | Kelm . |
| 5,516,187 | 5/1996 | Zani et al. . |
| 5,540,478 | 7/1996 | Schuch ................................ 296/197 |

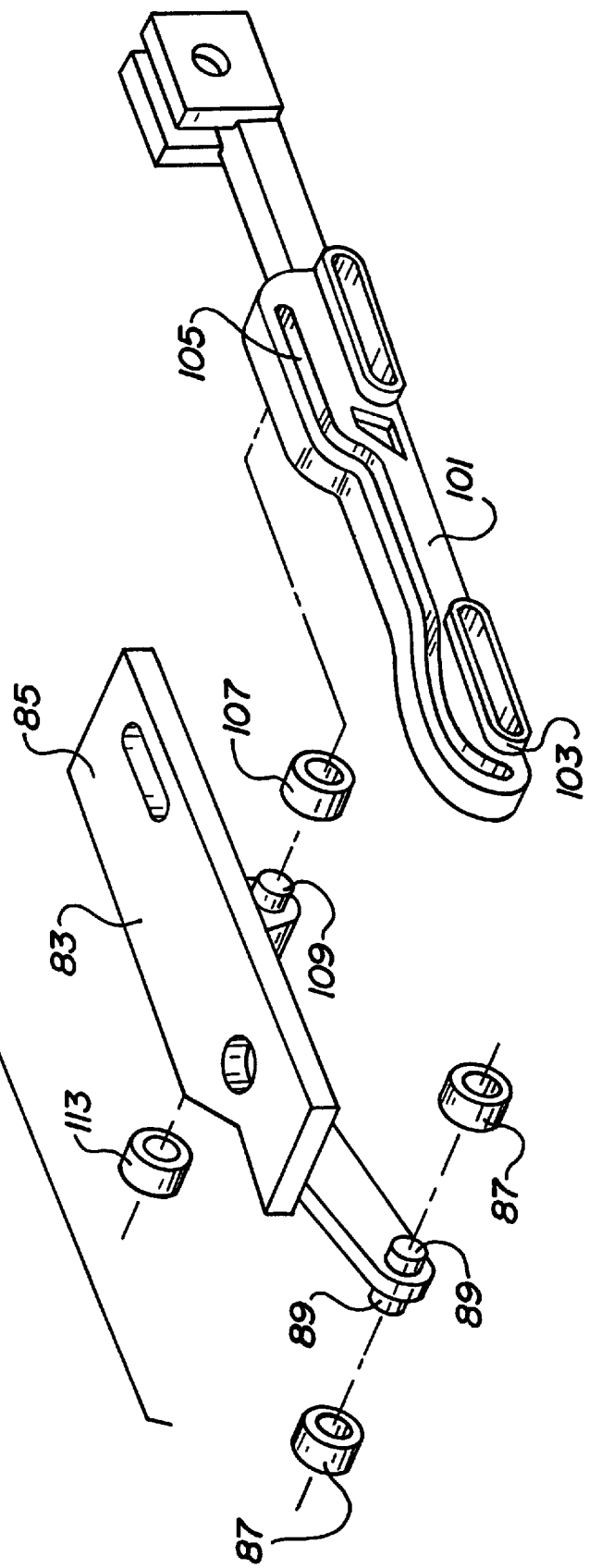

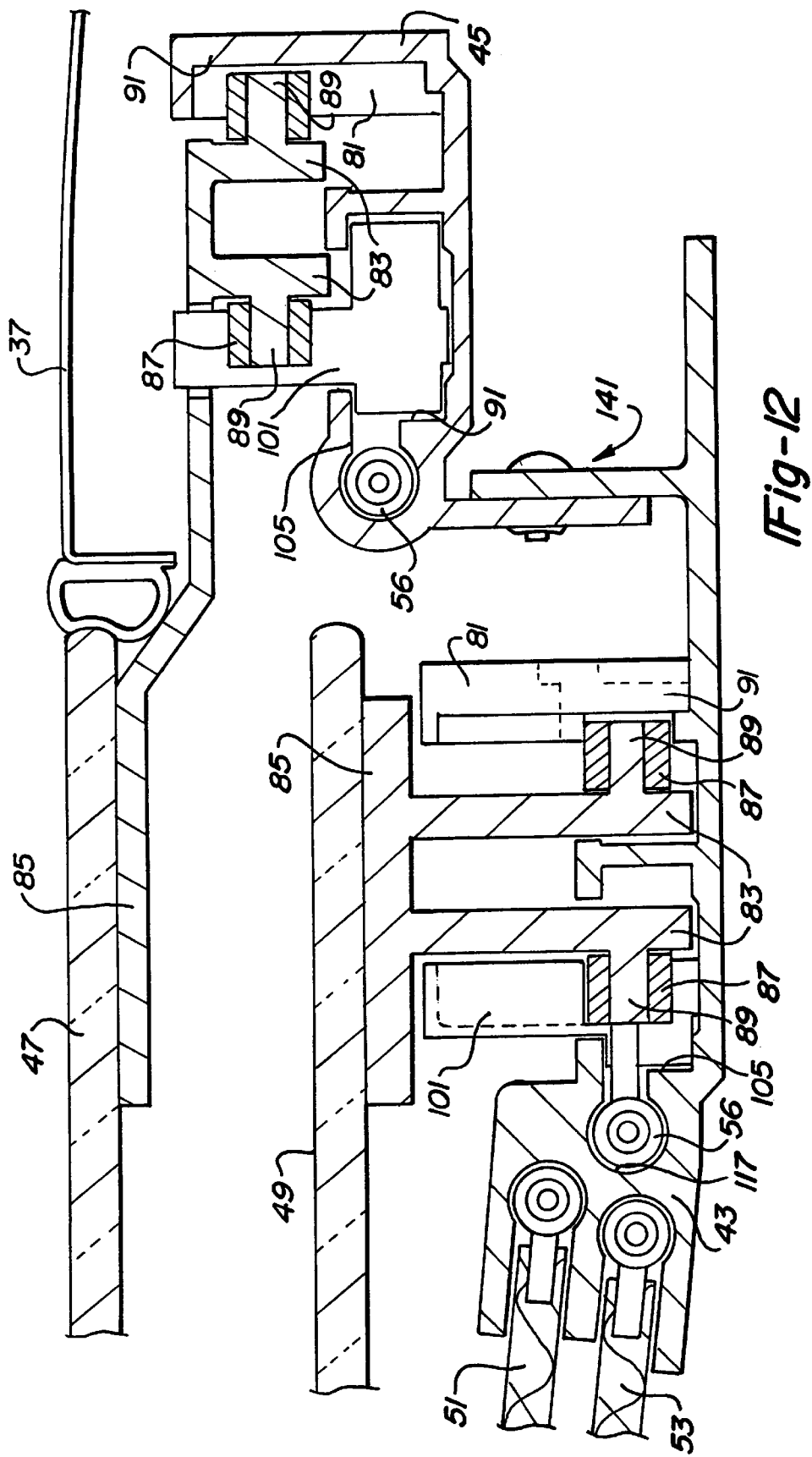

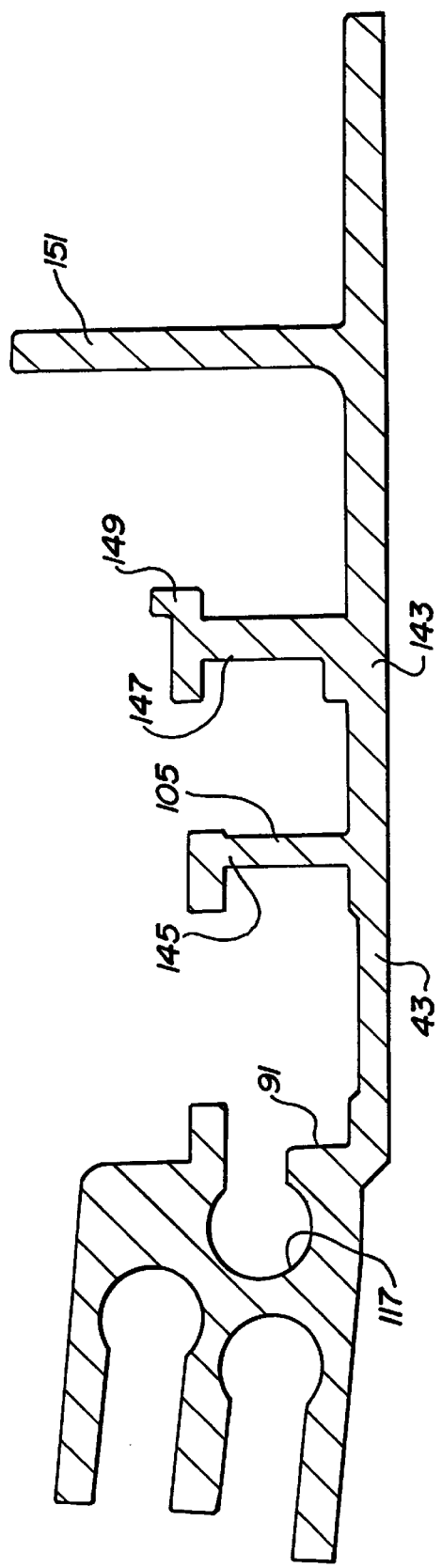

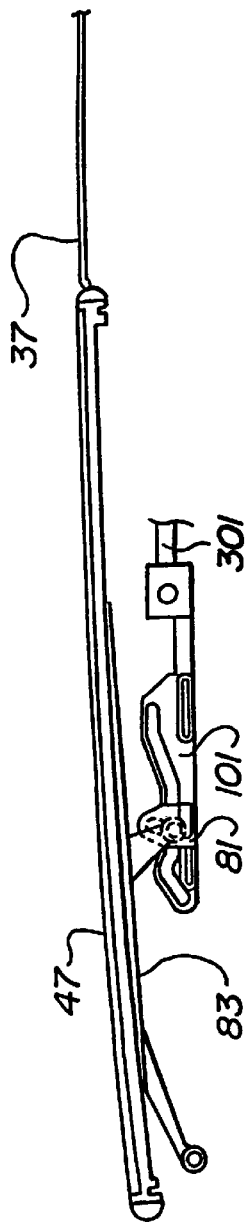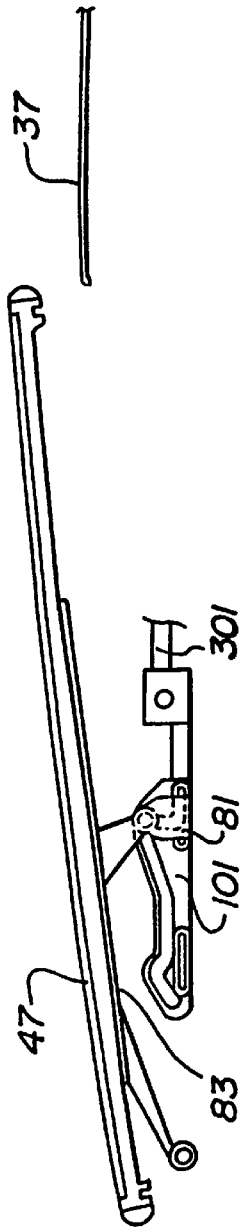

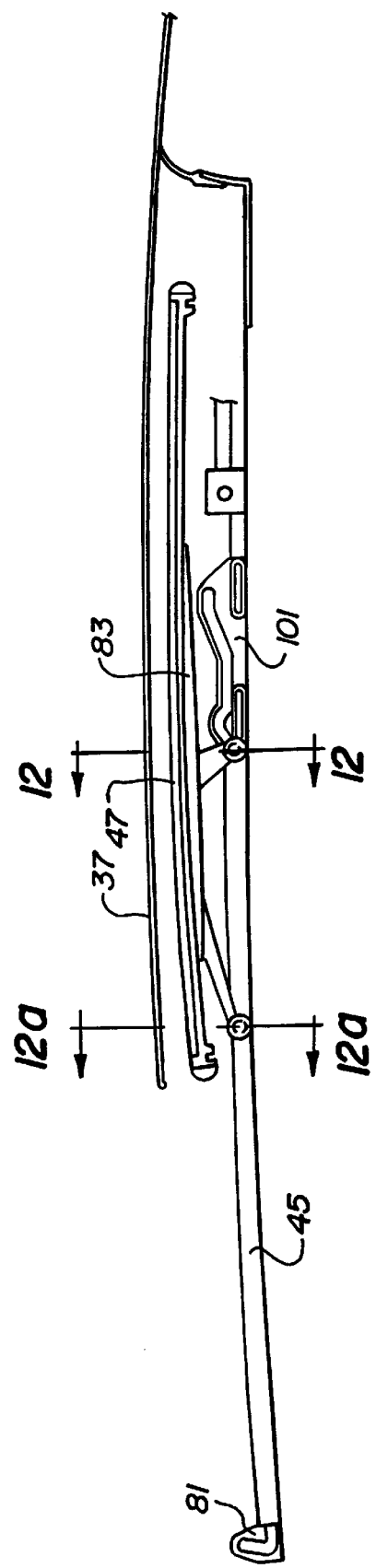

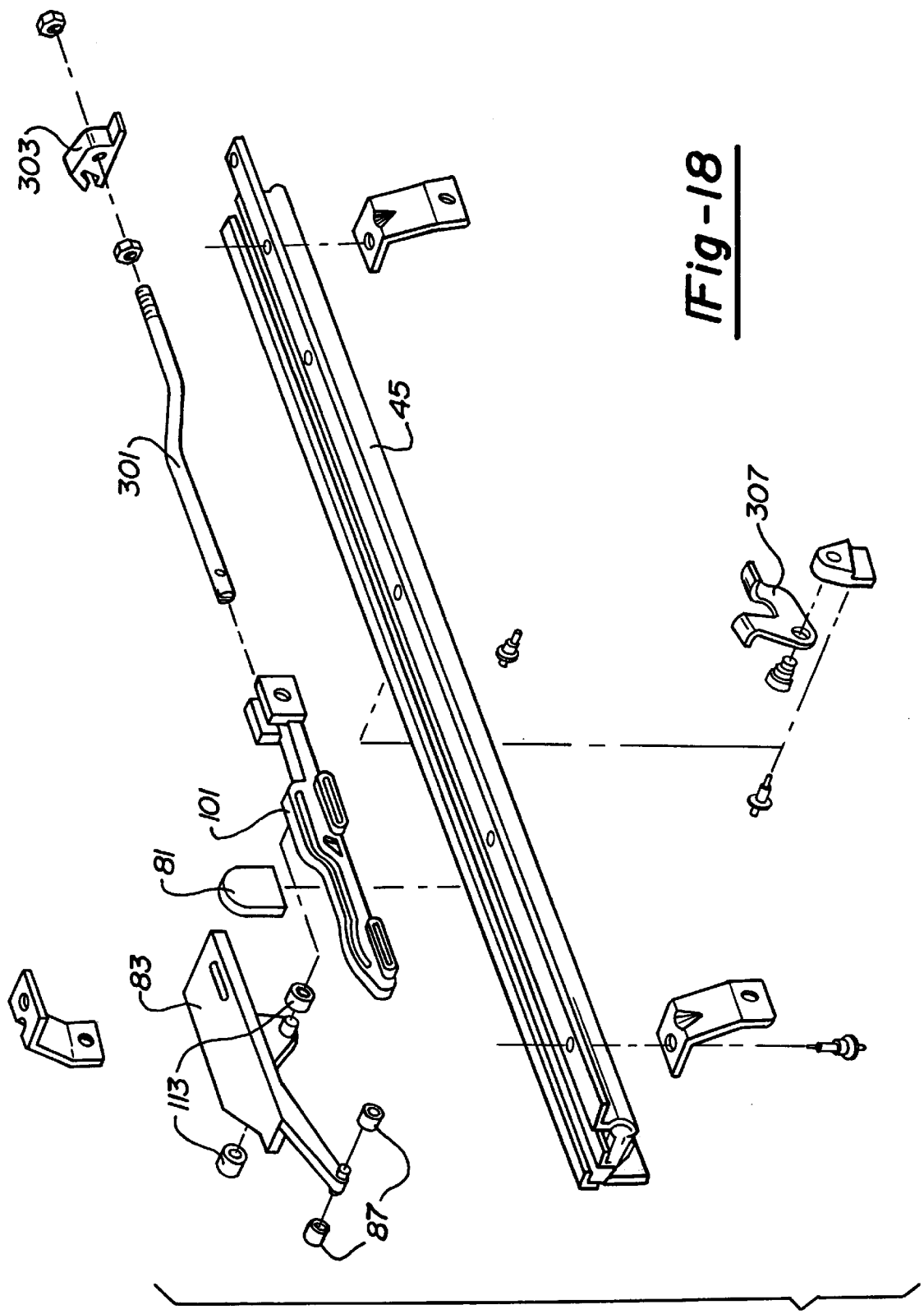

POWERED DUAL PANEL SUNROOF

BACKGROUND AND SUMMARY OF THE INVENTION

This invention relates generally to sunroof assemblies for automotive vehicles and specifically to a dual sunroof assembly for an automotive vehicle.

It is common knowledge to provide a single sunroof within a stationary roof of an automotive vehicle. These traditional sunroofs typically employ a glass or metal panel slidable from a covering position, somewhat flush with the stationary roof, to a retracted position which allows sunlight and ventilation access through an opening within the stationary roof. Another traditional sunroof construction provides a panel which is tiltable from a closed position to a pivoted venting position. This allows airs from within the vehicle to pass through an opening created between the vented panel and the stationary roof.

It is also known to provide two sunroof panels in automotive vehicles. Such a system is disclosed within the following U.S. Pat. No. 5,261,722 entitled "Variable Opacity, Maximally Transverse Retracting Sunroof System" which issued to Staley et al. on Nov. 16, 1993; U.S. Pat. No. 5,197,779 entitled "Power Sliding Sunroof" which issued to Mizuno et al. on Mar. 30, 1993; U.S. Pat. No. 5,029,937 entitled "Roof System for Vehicle" which issued to Yamamoto on Jul. 9, 1991; U.S. Pat. No. 4,911,496 entitled "Vehicle Roof with Front and Rear Covers" which issued to Fuerst on Mar. 27, 1990; and U.S. Pat. No. 4,619,480 entitled "Sunroof Panel Opening/Closing Apparatus" which issued to Motoyama et al. on Oct. 28, 1986. Another dual sunroof construction is disclosed in WO 96/01192, entitled "Automobile Sunroof Assembly and Control System", which was published on Jan. 18, 1996. While the U.S. Pat. No. 5,261,722 and PCT Publication No. WO 96/01192 double sunroof systems are significant improvements in the field, the sunroof opening size and sunlight access is still somewhat limited due to the specified packaging constraints and open panel positioning.

A single sliding interior sunshade has also been employed with various sunroofs. Such sunshades are typically horizontally oriented and slidably movable to expose or cover a sunroof. Examples of such devices are disclosed within U.S. Pat. No. 5,250,882 entitled "Sunshade Open/Close Control Devices for Vehicular Sun Roofing Apparatus" which issued to Odoi et al. on Oct. 5, 1993, and U.S. Pat. No. 4,946,225 entitled "Vehicle Roof" which issued to Jardin on Aug. 7, 1990.

In accordance with the present invention, the preferred embodiment of a sunroof assembly for an automotive vehicle employs a fixed roof panel, a rear sunroof panel movable from a closed position to an open position immediately beneath the fixed roof panel, a front sunroof panel movable from a closed position to an open position below the open rear sunroof panel, a rear sunshade movable from a closed position to an open position below the open front sunroof panel, and a front sunshade movable from a closed position to an open position below the open rear sunshade. The sunroof panels are movable independent of each other and the sunshades are movable independent of each other. In another aspect of the present invention, a slip plane mating structure allows for adjustable installation positioning of a front sunroof track relative to a rear sunroof track prior to fastening together of the tracks. A modular sunroof assembly is also provided.

The powered dual panel sunroof of the present invention is advantageous over conventional sunroof constructions. For example, the present invention sunroof assembly maximizes the sunroof opening area and sunlight access by the specific stacked relationship of the panels, as disclosed. Objectionable wind noise and unsightliness is also significantly reduced due to the packaging of the two sunroof panels and two sunshade panels below the fixed roof. The use of a glass fixed roof is also aesthetically beneficial by providing a more uniform roof appearance when all of the sunroof panels are closed.

Furthermore, the use of two separate tracks aligned by a slip plane mating construction advantageously allows for improved assembly of the sunroof by taking into account the different roof structure tolerances. Such part tolerances are especially exaggerated in the longitudinally elongated roof of a sport utility vehicle, van or station wagon when two sunroof panels are employed. The separate track construction of the present invention is further advantageous by cost effectively allowing for single sunroof or dual sunroof option variations while using common component parts. The double track construction also provides for the rear sunroof panel track and carrier to be disposed above and outboard of a front sunroof panel track and carrier. This further maximizes the sunroof open area. Additional advantages and features of the present invention will become apparent from the following description and appended claims, taken in conjunction with the accompanying drawings.

BRIEF DESCRIPTION OF THE DRAWINGS

FIG. 11 is an exploded perspective view showing a drive mechanism of the preferred embodiment sunroof;

FIG. 12 is a cross sectional view, taken along line 12—12 of FIG. 17, showing the preferred embodiment sunroof with the front sunroof panel in the open position and the rear sunroof panel in the closed position;

FIG. 14 is a cross sectional view, similar to that of FIG. 12a, showing a front track of the preferred embodiment sunroof;

FIG. 15 is a diagrammatic side elevational view showing the rear sunroof panel of the preferred embodiment sunroof disposed in a closed position;

FIG. 16 is a diagrammatic side elevational view showing the rear sunroof panel of the preferred embodiment sunroof disposed in a venting position;

FIG. 17 is a diagrammatic side elevational view showing the rear sunroof panel of the preferred embodiment sunroof disposed in a open position;

FIG. 18 is an exploded perspective view showing a stabilizer mechanism of the preferred embodiment sunroof;

DETAILED DESCRIPTION OF THE PREFERRED EMBODIMENT

Figure 1:
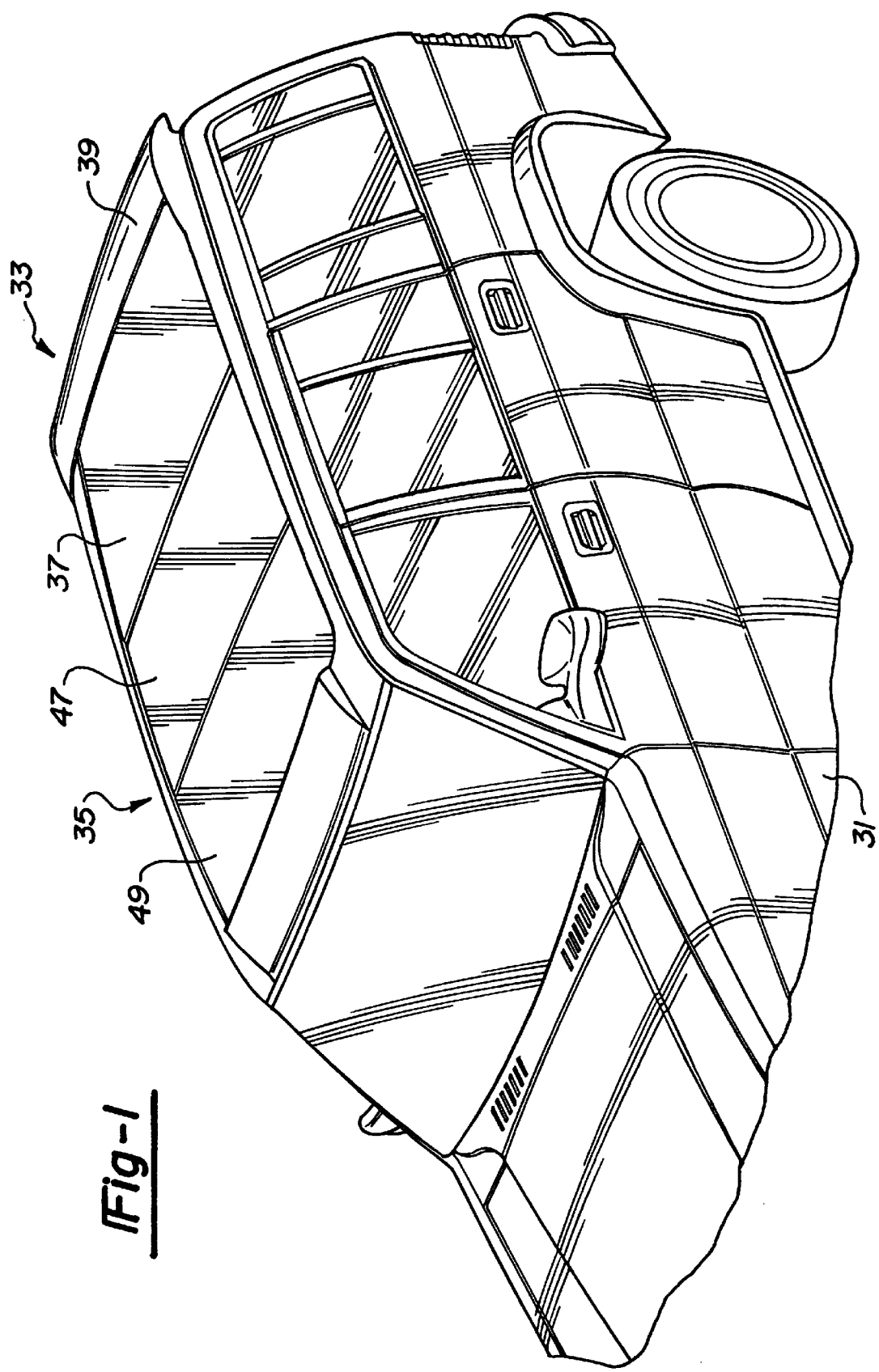
FIG. 1 is a perspective view showing the preferred embodiment of the powered dual panel sunroof of the present invention, with a front sunroof panel and a rear sunroof panel disposed in closed positions.

A sport utility automotive vehicle 31 employing a modular sunroof assembly 33 of the present invention is shown in FIG. 1. This modular sunroof assembly 33 includes a powered dual panel sunroof 35, a fixed roof panel 37 and an exterior frame 39. The stationary or fixed roof panel 37 is preferably made of glass employing a blackout frit on the lower surface, however, a more conventional stationary roof panel of a non-modular variety may alternately be used.

Figure 8:
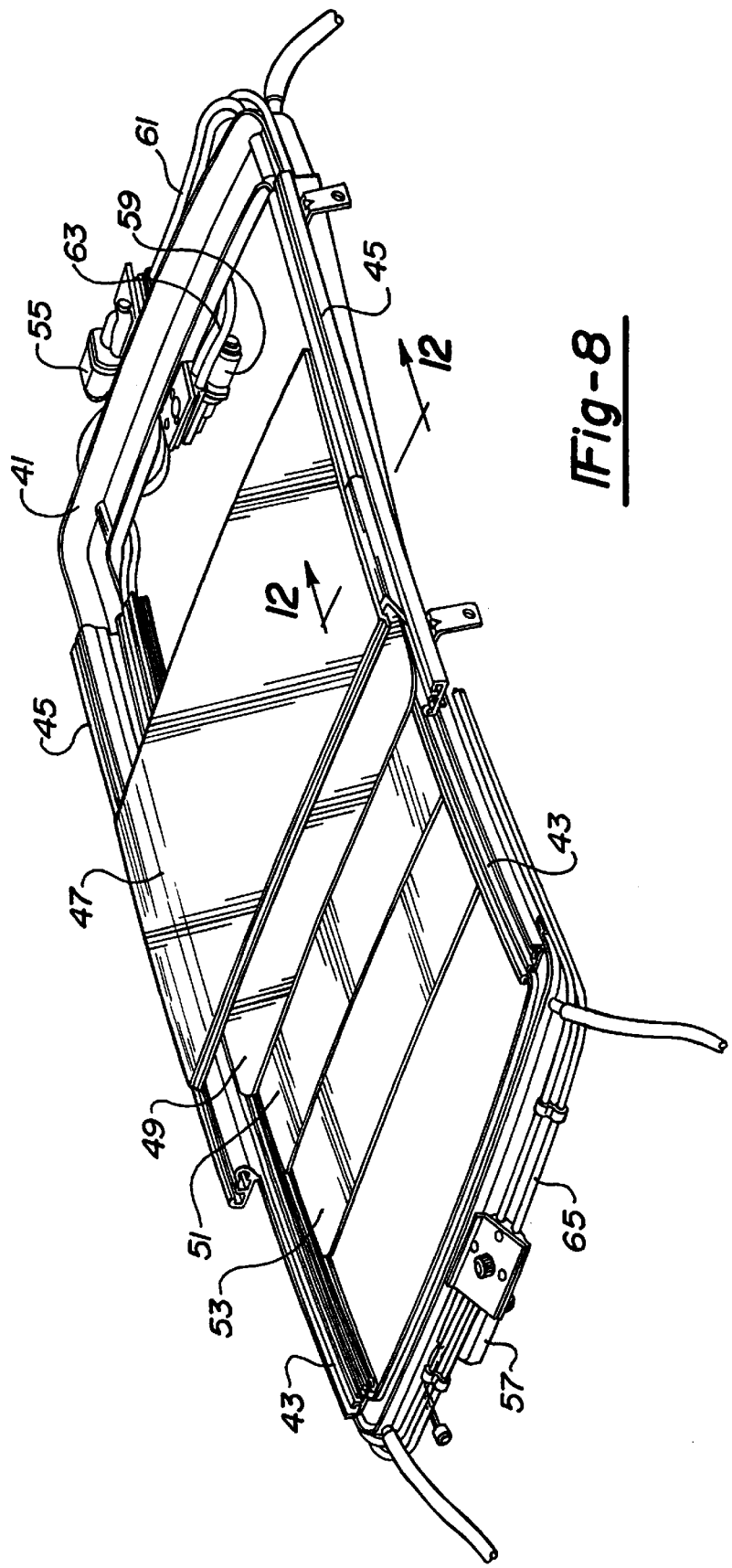
FIG. 8 is a perspective view showing a sunroof tub of the preferred embodiment sunroof.
Figure 9:
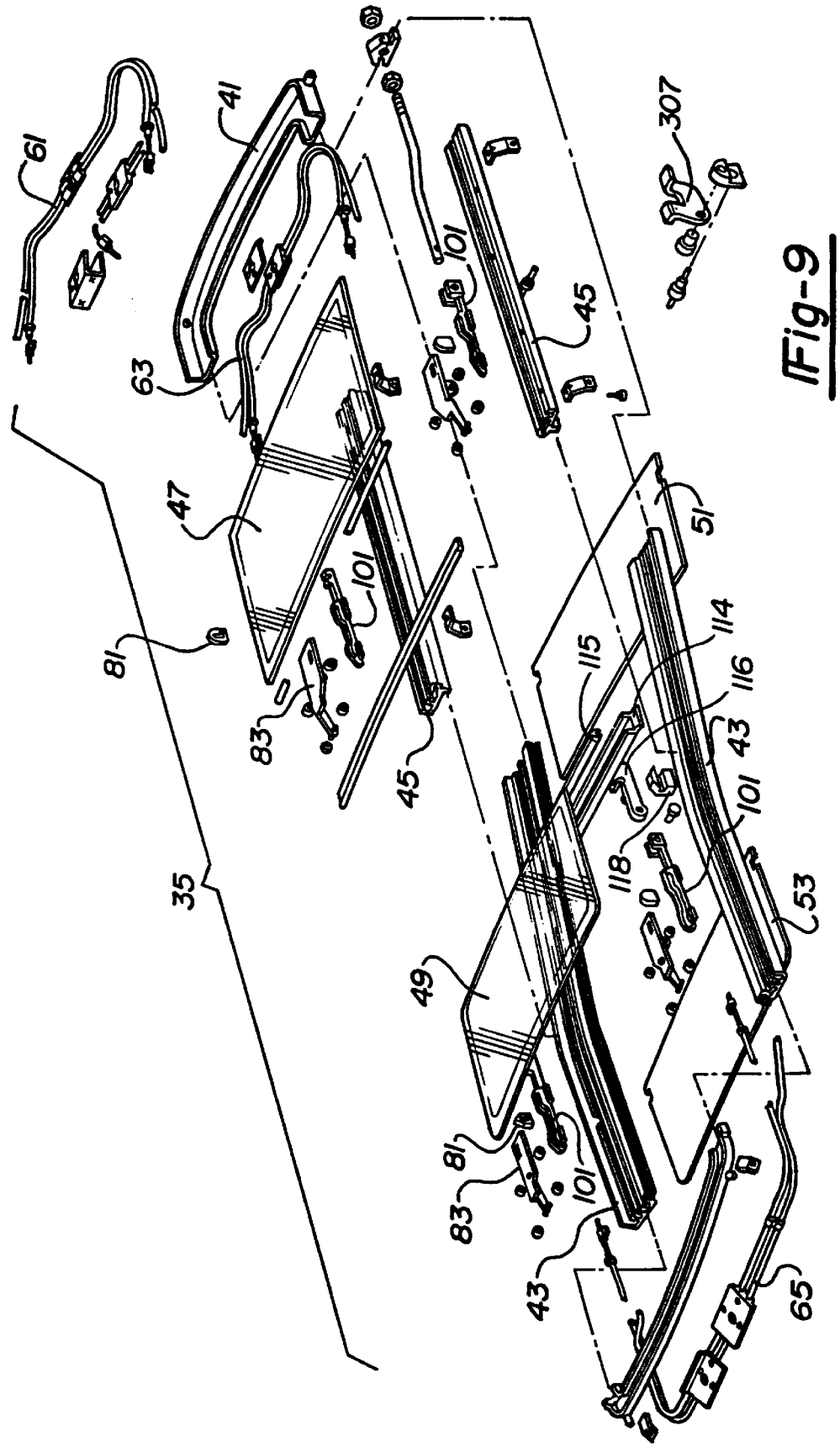
FIG. 9 is an exploded perspective view showing the sunroof tub of the preferred embodiment sunroof.
Figure 12A:
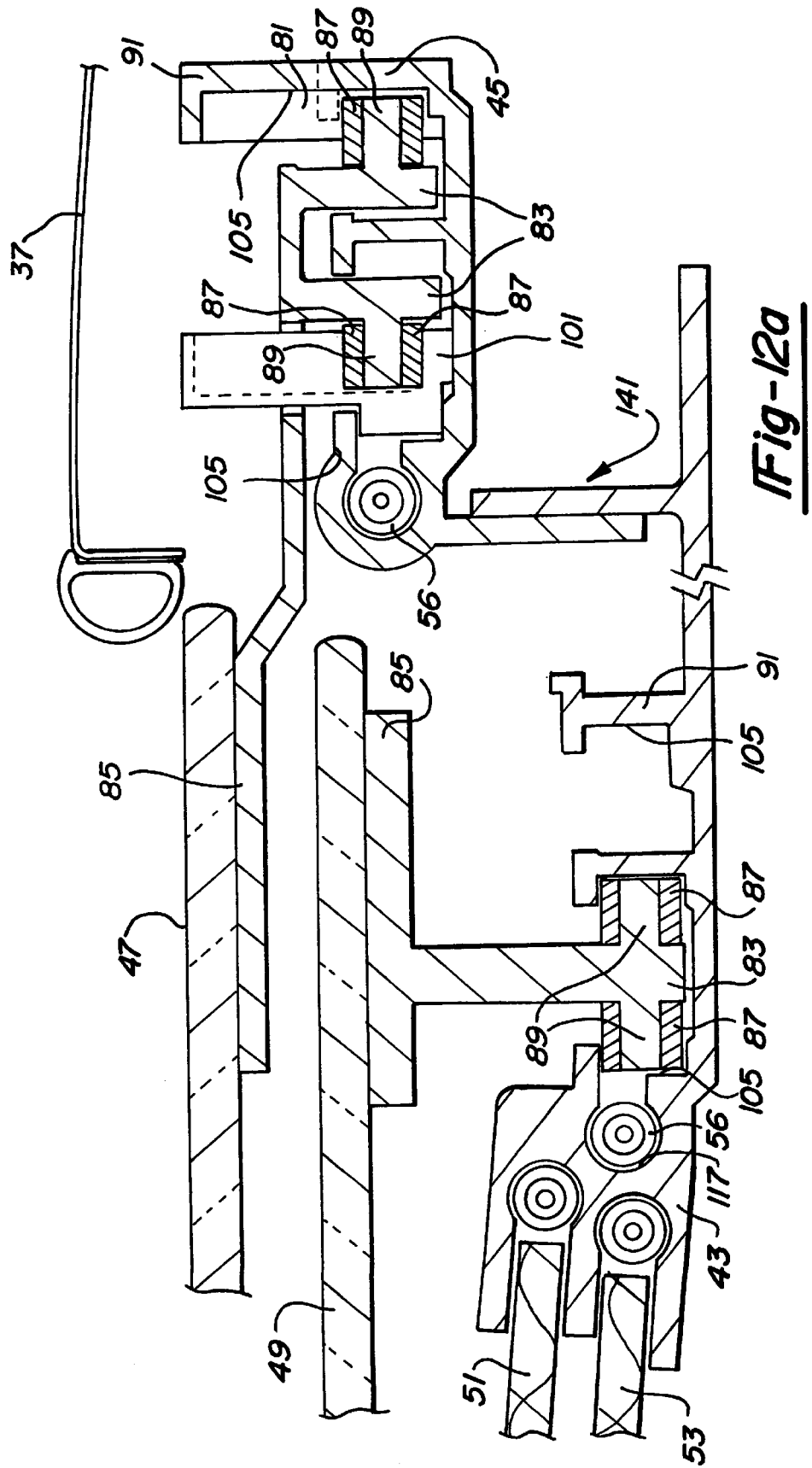
FIG. 12a is a cross sectional view, taken along line 12a—12a of FIG. 17 for the front sunroof panel (hidden behind the rear sunroof panel in FIG. 17) and along line 12—12 of FIG. 17 for the rear sunroof panel, showing the preferred embodiment sunroof with the front sunroof panel in the open position and the rear sunroof panel in the open position.
Figure 13:
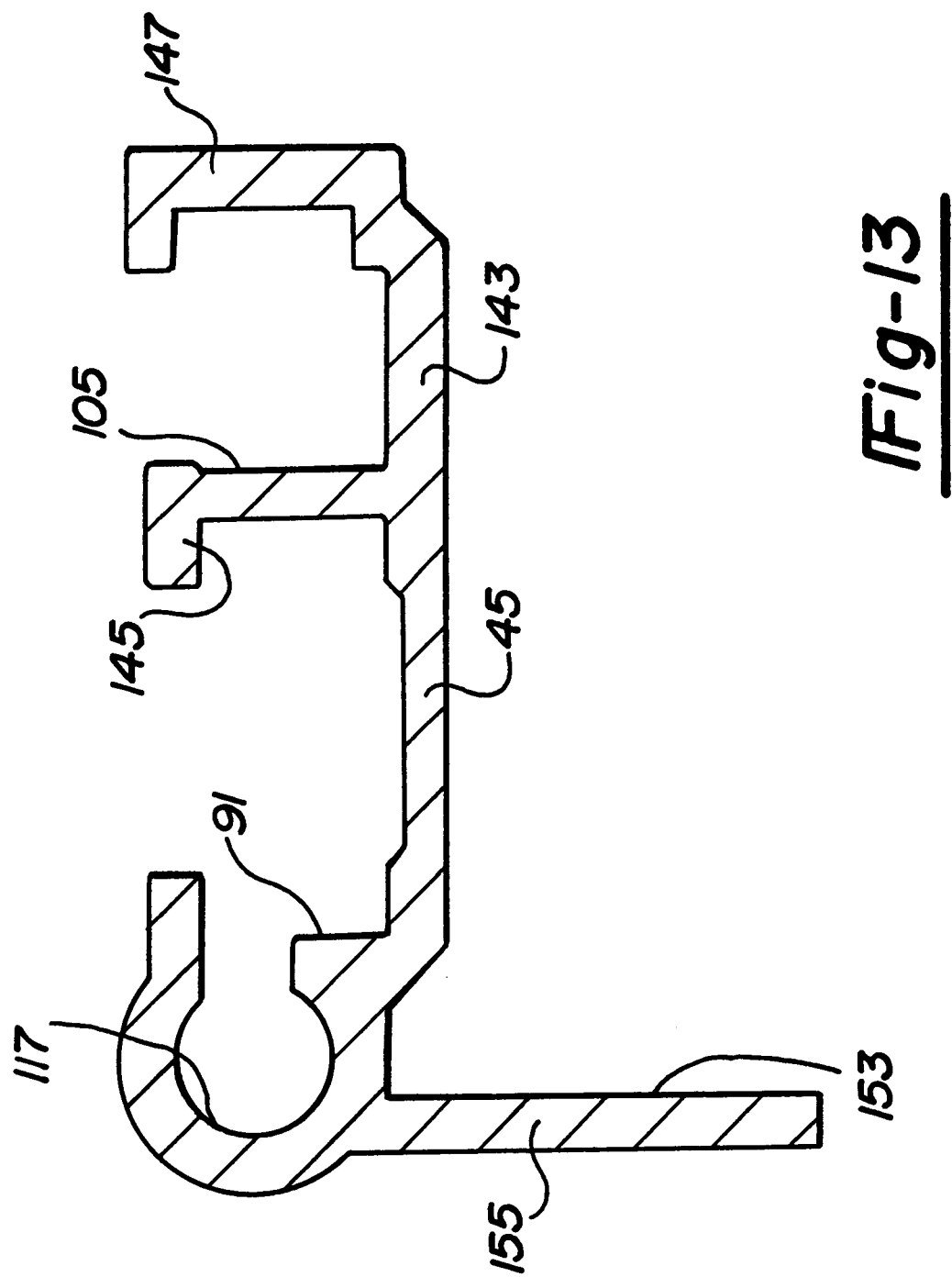
FIG. 13 is a cross sectional view, similar to that of FIG. 12a, showing a rear track of the preferred embodiment sunroof.

Referring to FIGS. 8 and 9, powered dual panel sunroof 35 includes a sunroof tub 41 constructed with a front pair of tracks 43 and a rear pair of tracks 45, all of which are elongated in a longitudinal or fore-and-aft direction of the automotive vehicle. The left and right tracks of each pair are in mirrored symmetry of each other. Powered dual panel sunroof 35 further has a rear glass sunroof panel 47, a front glass sunroof panel 49, a rear plastic or cloth covered rigid sunshade panel 51, and a front plastic or cloth covered rigid sunshade panel 53. A fractional horsepower, dc electric motor 55 and cable 56 (see FIG. 12) operably drive rear sunroof panel 47, while a similar electric motor (not shown), positioned beneath motor 55, and cable drive rear sunshade 51. Furthermore, a third electric motor 57 and cable serve to drive front sunroof panel 49 while a fourth electric motor and cable operably drive front sunshade 53. The cables are preferably SU-FLEX brand flocked cable, which can be purchased from Suhner Manufacturing, Inc. of Rome, Ga. Steel cable guide tubes and bracket assemblies 61, 63 and 65 interface with the corresponding electric motors and are mounted to sunroof tub 41.

The following table 1 and FIGS. 1–6 illustrate the various combinations of sunroof panel and sunshade panel positions provided in the present invention.

TABLE 1

| | | Forward Closed/Vent | Rear Closed/Vent | Stowed Position |
|---|---|---|---|---|
| 1 | Sunroof Shade | ▨▨ | ▨▨ | |
| 2 | Sunroof Shade | ▨▨ | ▨▨ | ▨▨ |
| 3 | Sunroof Shade | ▨▨ | ▨▨ | ▨▨ |
| 4 | Sunroof Shade | ▨▨ | | ▨▨ ▨▨ |
| 5 | Sunroof Shade | | ▨▨ ▨▨ | |
| 6 | Sunroof Shade | ▨ | ▨▨ ▨▨ | |
| 7 | Sunroof Shade | ▨ | | ▨▨ ▨▨ |
| 8 | Sunroof Shade | | | ▨▨ ▨▨ |
| 9 | Sunroof Shade | ▨▨ | ▨ | ▨▨ |
| 10 | Sunroof Shade | ▨ | ▨ | ▨▨ |

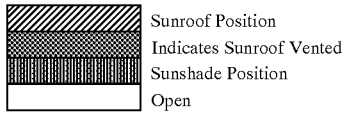

Figure 2:
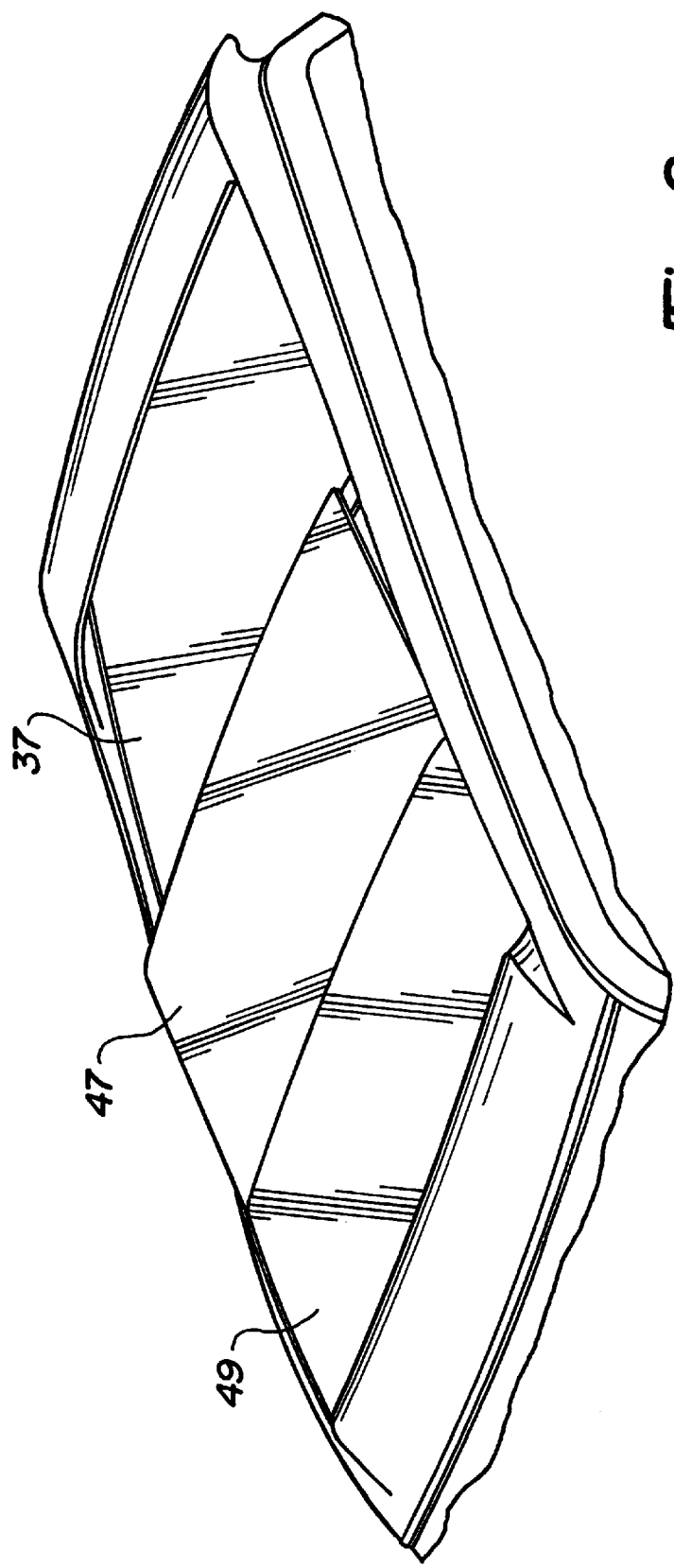
FIG. 2 is a fragmentary perspective view showing the preferred embodiment sunroof, with the front sunroof panel disposed in a closed position and the rear sunroof panel disposed in a venting position.

Code:
- ▨ Sunroof Position
- ▨ Indicates Sunroof Vented
- ▨ Sunshade Position
- ☐ Open FIG. 1 shows front sunroof panel 49 and rear sunroof panel 47 disposed in closed positions. In the sunroof panel positions of FIG. 1, the sunshade panels may both be in their closed positions directly below each corresponding sunroof panel, they may both be in the fully open/stowed positions directly below stationary roof panel 37, or either one of the sunshade panels may be in its closed position while the other is in an intermediate position below the closed rear sunroof panel 47 or below stationary roof panel 37. FIG. 2 shows front sunroof panel 49 disposed in its closed position and rear sunroof panel 47 in a pivoted venting position. In the combination of FIG. 2, the front sunshade can either be in its closed position below front sunroof panel 49 or it can be in the fully open/stowed position below stationary roof panel 37; simultaneously the rear sunshade is disposed in its fully open/stowed position below stationary roof panel 37, thereby allowing air ventilation through the vented rear sunroof panel 47.

Figure 3:
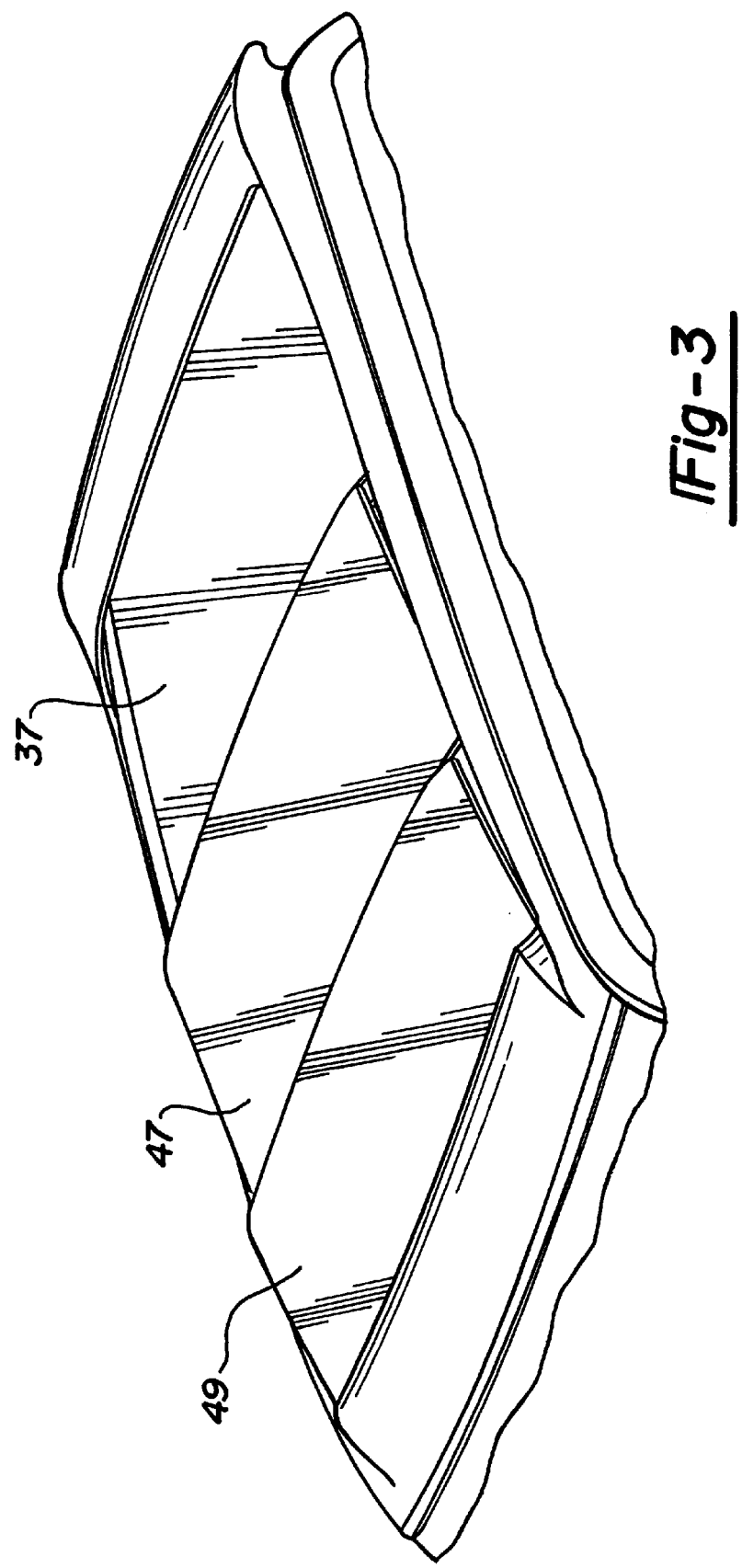
FIG. 3 is a fragmentary perspective view showing the preferred embodiment sunroof, with the front and rear sunroof panels disposed in venting positions.
Figure 4:
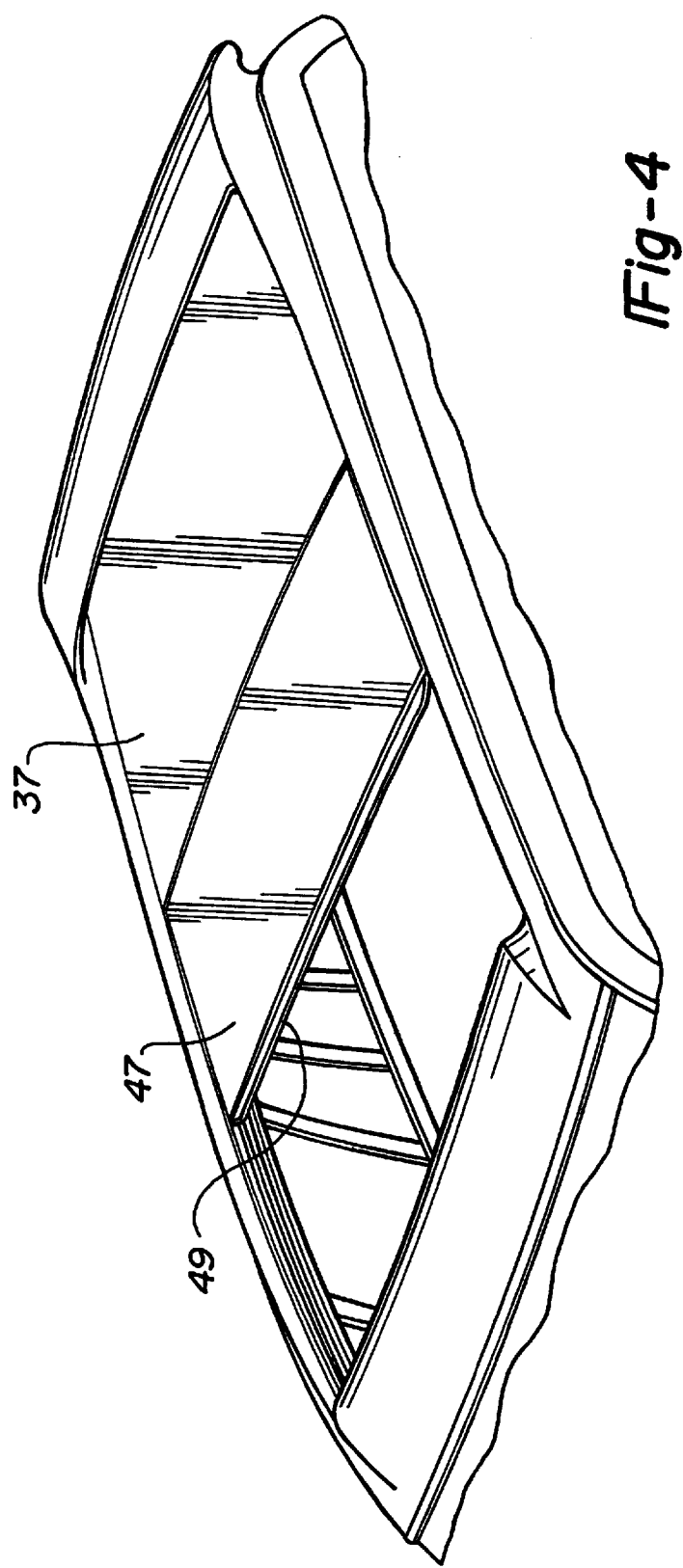
FIG. 4 is a fragmentary perspective view showing the preferred embodiment sunroof, with the front sunroof panel disposed in an intermediate position and the rear sunroof panel disposed in the closed position.

FIG. 3 illustrates front and rear sunroof panels 49 and 47, respectively, pivoted to their venting positions. In this sunroof panel orientation, both of the sunshades are moved to their fully open/stowed position below stationary roof panel 37. FIG. 4 shows front sunroof panel 49 moved to an intermediate open position directly below the closed position of rear sunroof panel 47. In the situation of FIG. 4, both of the sunshades can either be disposed below the closed rear sunroof panel 47 or they can both be in their fully open/stowed positions beneath stationary roof panel 37.

Figure 5:
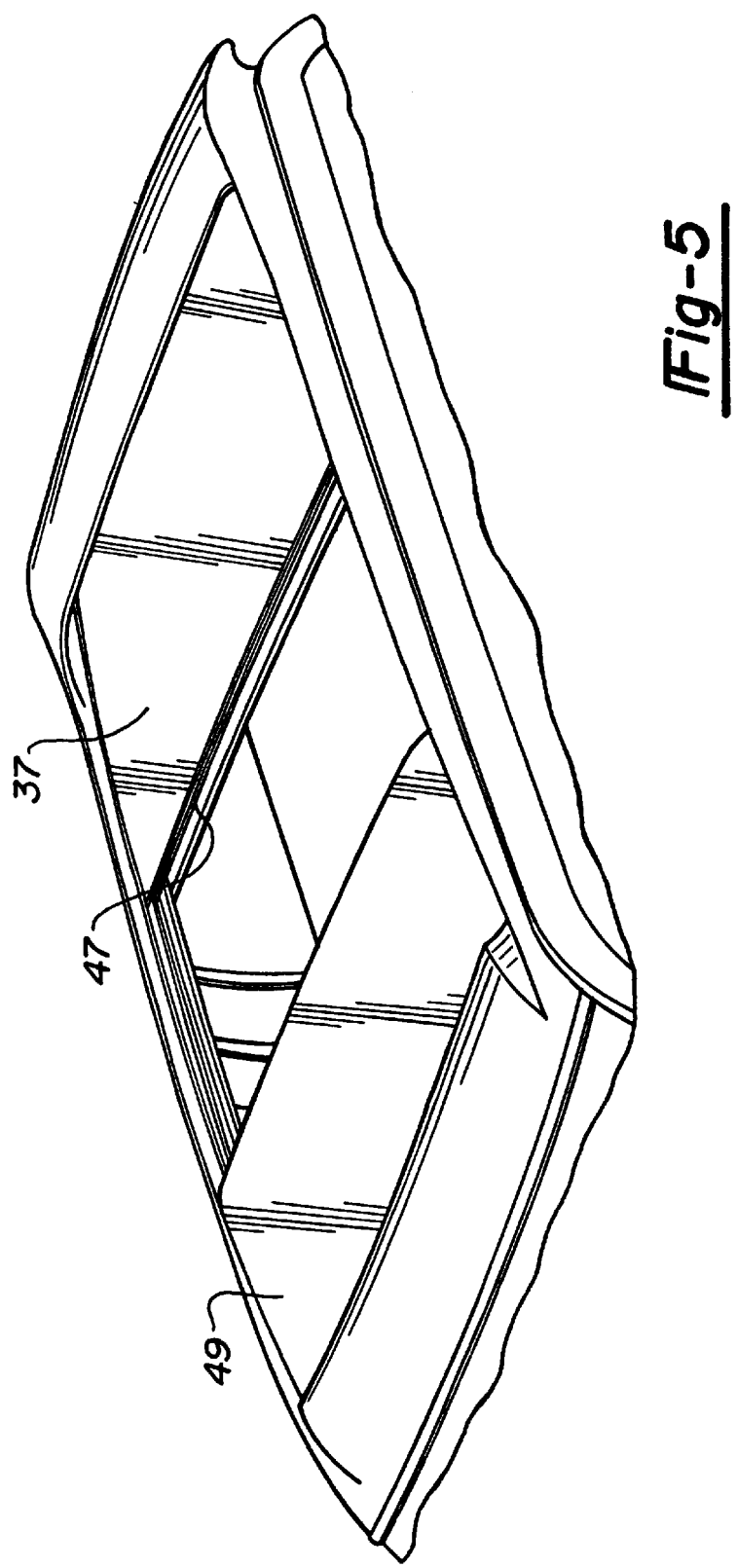
FIG. 5 is a fragmentary perspective view showing the preferred embodiment sunroof, with the front sunroof panel disposed in the closed position, the rear sunroof panel disposed in an open position, a front sunshade disposed in a closed position and a rear sunshade disposed in an open position.

FIG. 5 discloses the scenario wherein front sunroof panel 49 is in its closed position while rear sunroof panel 47 is in its fully open/stowed position directly beneath stationary roof panel 37. In this arrangement, the rear sunshade panel is slid to its fully open/stowed position and the front sunshade panel can either remain in its closed position below the closed front sunroof panel 49 or it can be fully open/stowed below stationary roof panel 37. Although not shown, for the rear sunroof panel orientation of FIG. 5, front sunroof panel 49 can also be pivoted to its vented position. Finally, FIG. 6 shows all of the sunroof panels and sunshades disposed in their fully open/stowed positions below stationary roof panel 37, thereby allowing an optimized and very large roof opening above both front and rear seating areas within the automotive vehicle.

Figure 6:
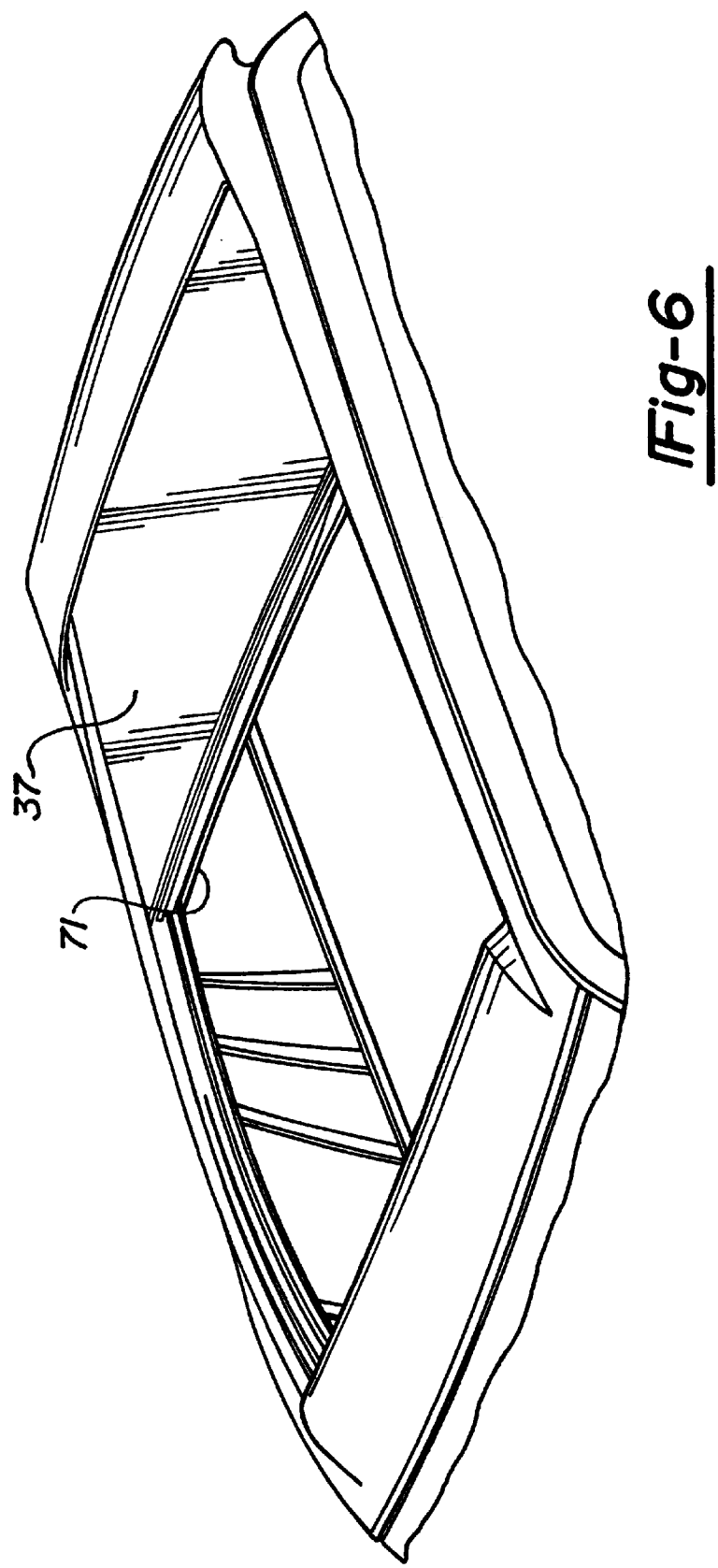
FIG. 6 is a fragmentary perspective view showing the preferred embodiment sunroof, with all of the sunroof panels and sunshades disposed in open positions.
Figure 7:
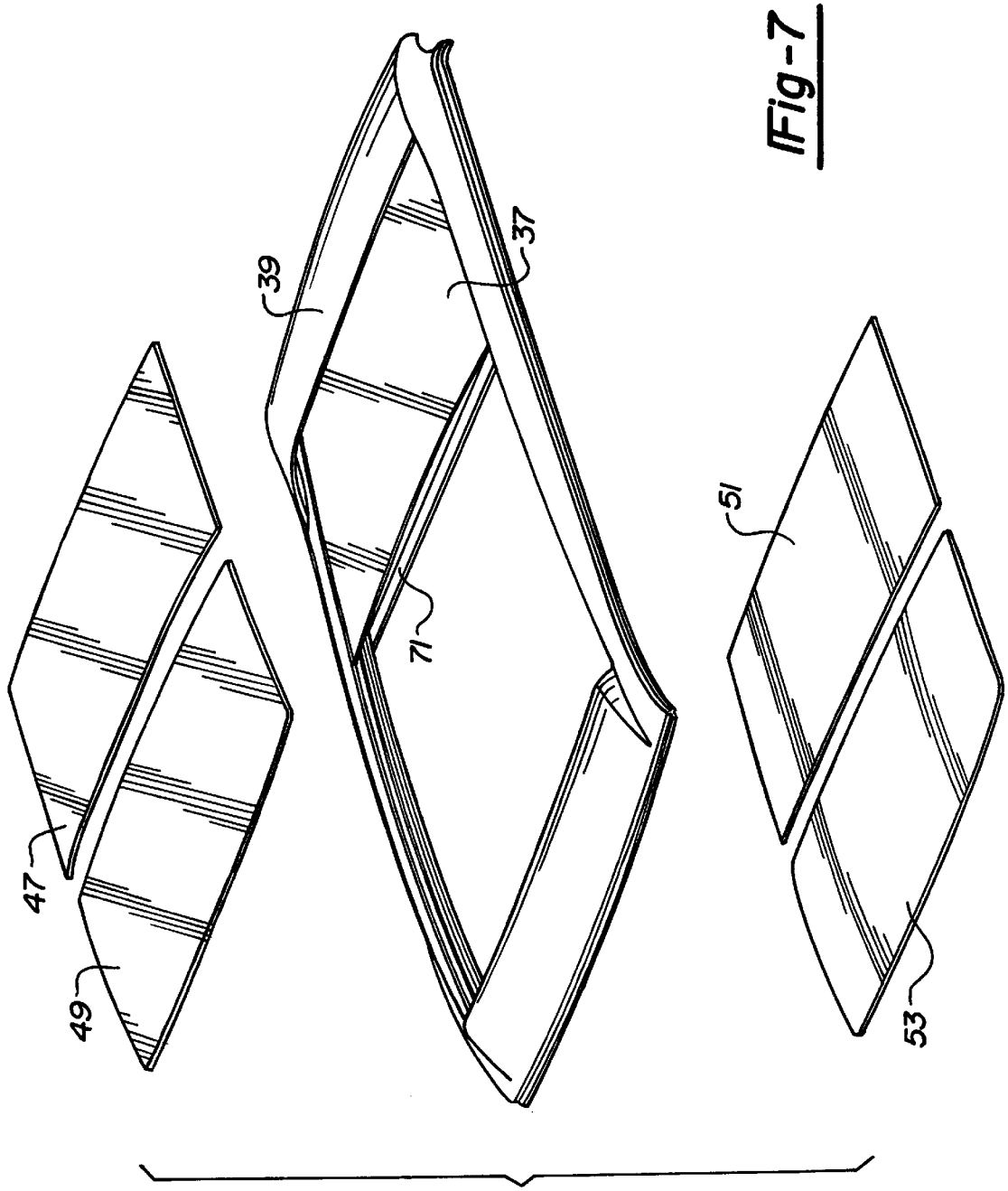
FIG. 7 is a partially exploded perspective view showing the preferred embodiment sunroof.

As can be observed in FIGS. 6, 7 and 8, when the sunroof and sunshade panels are all slid to their fully open/stowed positions, they are almost completely hidden from view between stationary roof panel 37 and a fixed headliner 71 mounted to an inside surface of sunroof tub 41. When in this fully open position, rear sunroof panel 47 is immediately below stationary roof panel 37, front sunroof panel 49 is directly below rear sunroof panel 47, rear sunshade panel 51 is directly below front sunroof panel 49, and front sunshade panel 53 is directly below rear sunshade panel 51. This packaging advantageously avoids the wind noise problems sometimes associated with spoiler type sunroofs and is more suited for packaging rear of the front and rear seating areas. This is achieved by employing the preferred front track configuration wherein each front track 43 has a generally horizontal forward section and a downwardly angled rearward section, as viewed from the side.

The symmetrically opposite, pairs of mechanisms for moving each sunroof panel can be observed by referring to FIGS. 9, 11, 12 and 12a. For each mechanism, a polymeric stationary cam 81 is stationarily positioned within a notched out portion of each track. Stationary cam 81 has a generally L-shaped camming groove defined by an arcuate vertical leg and a generally straight horizontal leg. The horizontal leg is open to the rear and is somewhat co-linearly aligned with an outboard channel 91 of each track. An aluminum or steel sunroof panel mounting guide carriage 83 has a generally flat pane supporting segment 85 removably affixed to the adjacent outboard portion of the corresponding sunroof panel. Bronze, annular guide bushings 87 surround transversely extending forward posts 89 of carriage 83. Bushings 87 ride within channels of each track.

Each moving cam 101 has four transversely extending feet 103 which ride within an inboard channel 105 of each track. Moving cam 101 has a longitudinally elongated camming groove 105 which receives a cam follower bushing 107, surrounding a cam follower pin 109 which transversely projects outward from carriage 83. An outwardly extending cam follower pin and a bushing 113 are received within the groove of stationary cam 81 when the pin and bushing 113 are in their forwardmost positions. A steel water drain 114, having rubber seals 115, is attached to front moving cams 101 by forwardly extending L-shaped drain brackets 116. Thus, drain 114 moves with front sunroof panel 49. A pair of outwardly slotted guides 118 are stationarily secured to tracks 43 for receiving pins or tabs inwardly depending from drain brackets 116. Thus, front sunroof panel 49 is operably secured in the closed position to tracks 43 and sealed to drain 114 by engagement of guides 118 with the drain bracket pins.

Each cable 56 is received within a circular cross sectional cavity 117 open to channel 91. Cable 56 serves to operably drive moving cam 101 thereby moving each carriage and sunroof panel from their closed positions (see FIG. 15), to their venting positions (see FIG. 16) and to their fully open positions (see FIG. 17).

Referring now to FIGS. 12, 12a, 13 and 14, a slip plane mating fastening system 141 is employed to align each front track 43 with each rear track 45. Each track has a generally horizontal base 143 with a pair of generally L-shaped arms 145 and 147 upwardly extending from base 143. An extra tab 149 outwardly projects from arm 147 of front track 43. A longitudinally elongated and continuous (in other words, predominantly unbroken) tongue 151 projects upward from base 143 in a generally perpendicular manner. Tongue 151 is located adjacent to a parallel leg 155 downwardly projecting from rear track 45. Space is provided to allow vertical and angular movement along the generally vertical plane between tongue 151 and leg 155. This allows each rear track 45 to be adjustably engaged upon each corresponding front track 43 until the desired relative orientation between the tracks and against the stationary roof surface is achieved. This slip plane mating adjustment feature compensates for the inevitable tolerance variations between different vehicles. The slip plane mating also allows for deletion of the rear sunroof panel and tracks depending upon customer option preferences while still employing the common front track and mechanism arrangement. Notwithstanding, slip plane mating fastening system 141 maintains the important crosscar relative alignment of tracks. After the track-to-track insertion and vertical adjustments are performed, rivets or bolts 171 are transversely inserted through the tongue 151 and leg 155 to permanently affix the tracks in the desired final condition. Alternately, tongue 151 is received within a groove, defined between a pair of longitudinally elongated, continuous and downwardly projecting legs. All of the tracks are preferably extruded from aluminum.

Figure 19:
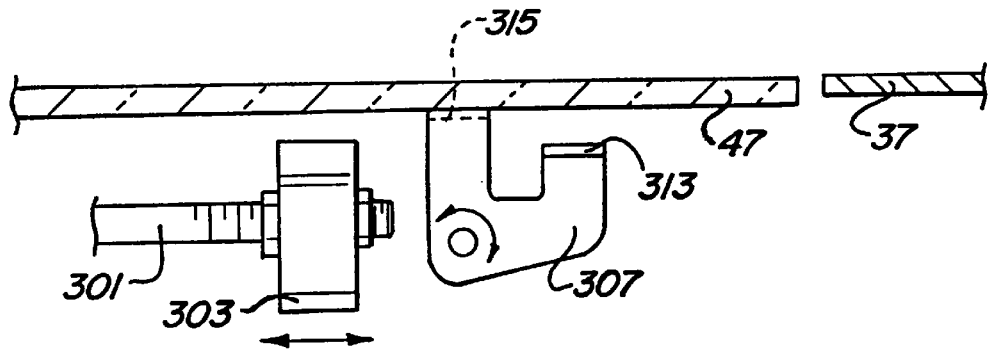
FIG. 19 is a side diagrammatic view showing the stabilizer mechanism of the preferred embodiment sunroof, disposed in a closed window position.
Figure 20:
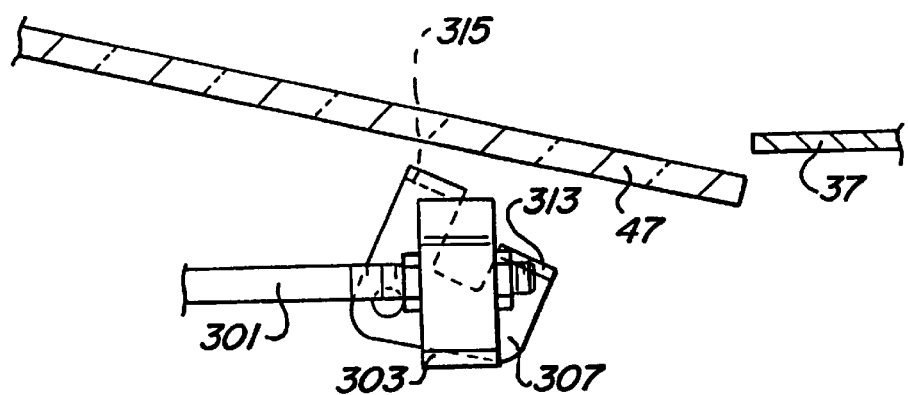
FIG. 20 is a side diagrammatic view showing the stabilizer mechanism of the preferred embodiment sunroof, disposed in an open window position.

A preferred embodiment window stabilizer mechanism is shown in FIGS. 18–20. A forward end of a bent metal rod 301 is riveted between spaced and upstanding walls that depend from each rear moving cam 101. A threaded rear end of rod 301 is adjustably secured to a slide actuator 303 by a pair of nuts to account for tolerance differences. Slide actuator 303 has a base movably engaged in rear track 45 and a bore for receiving rod 301. A finger 305 inwardly projects from slide actuator 303. Each of a pair of stamped metal stabilizer levers 307 is pivotably mounted to a plastic spacer 309 by a shoulder rivet 311, which in turn is stationarily riveted to an inner side surface of rear track 45.

Figure 21:
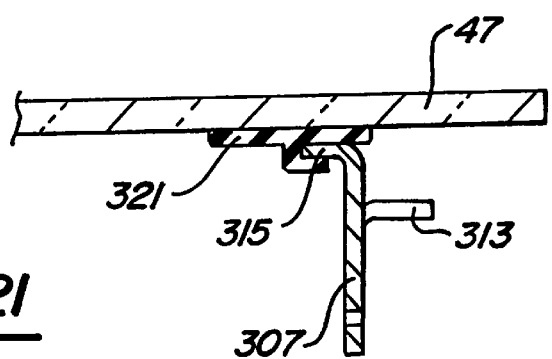
FIG. 21 is a cross sectional view showing an alternate embodiment of the stabilizer mechanism of the sunroof, disposed in a closed window position.

Accordingly, when rear moving cam 101 is linearly moved rearward by its associated cable, finger 305 of slide actuator 303 will push against an outwardly bent projection 313 of lever 307. This will cause lever 307 to pivot rearwardly about rivet 311 thereby disengaging an inwardly bent projection 315 from a bottom surface of rear sunroof panel 47 (see FIG. 20). Rear sunroof panel 47 will subsequently move to its open position after lever 307 has been moved to its disengaged or open position. There is approximately one inch of idle or lost motion movement of moving cam 101 before concurrent movement of rear sunroof panel 47. Lever 307 is returned to its nominal engaging or closed position (see FIG. 19) by spring biasing or through contact with finger 305 after rear sunroof panel 47 has been moved to its closed position. In the closed position, projection 315 abuts against and stabilizes a lower surface of rear sunroof panel 47. As is illustrated in FIG. 21, it is alternately envisioned that a plastic locking member 321 is adhered to the lower surface of rear sunroof panel 47. A slot is provided in locking member 321 for selectively receiving projection 315 of lever 307.

Figure 10:
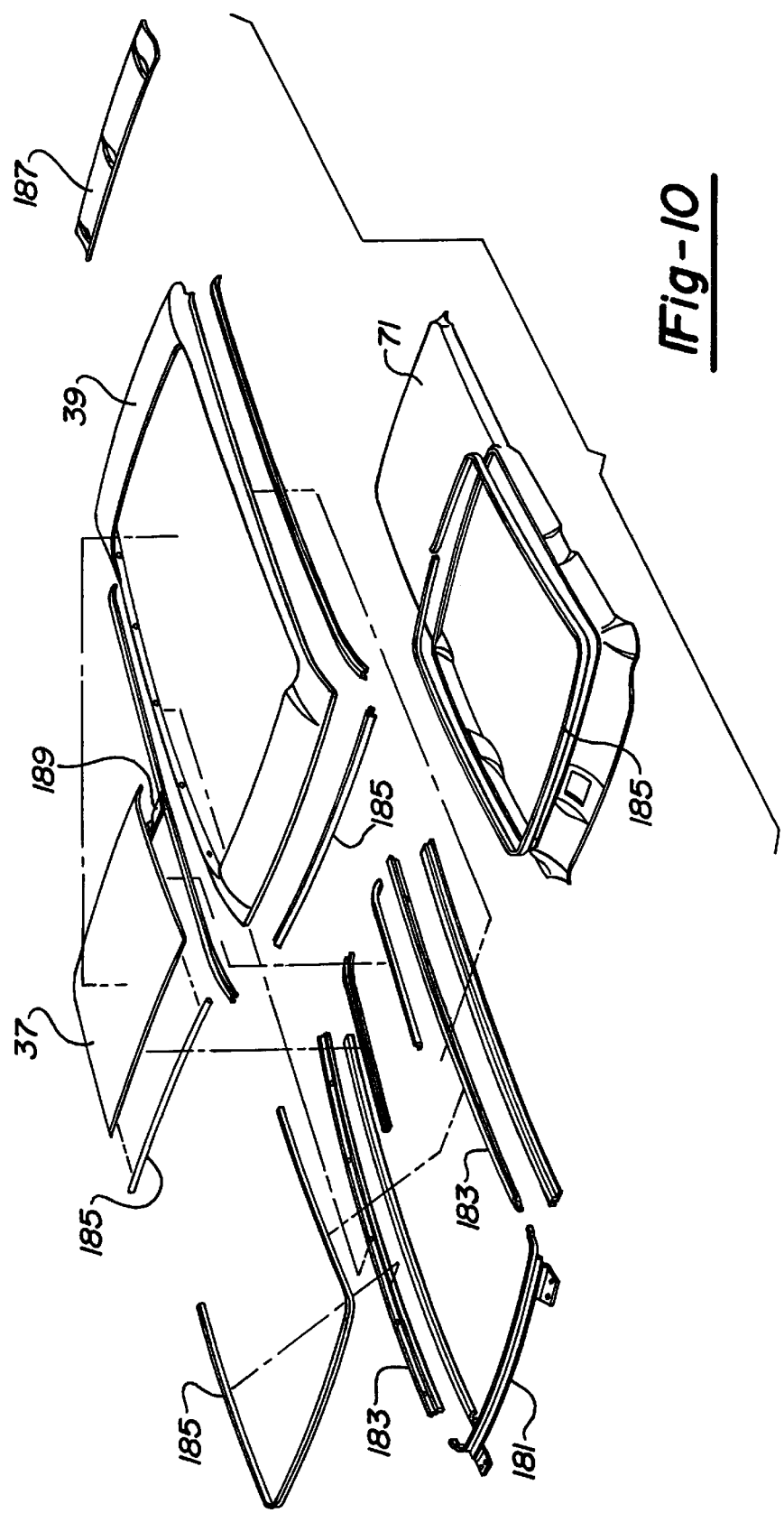
FIG. 10 is an exploded perspective view showing a fixed roof module of the preferred embodiment sunroof.

Finally, FIGS. 7 and 10 show the modular sunroof frame components. These frame components consist of outer frame 39, headliner 71, a front mounting bracket 181, side mounting brackets 183, elastomeric seals 185, exterior spoiler closeout panel 187 and various interior trim panels 189. The spoiler close out panel 187 is fastened to the underside of the rear portion of outer frame 39 to form an aesthetically attractive rear spoiler positioned above the stationary roof or rear header. The modular unit provides for use of the common powered dual panel sunroof of the present invention in other automotive vehicles, such as vans, station wagons and other model sport utility vehicles regardless of the individually shaped non-sunroof roof configurations. With the present invention modularization, the unit is mounted directly to the side rails and header panels thereby replacing the non-sunroof fixed roof in its entirety. Additionally, the modular sunroof assembly improves tolerances and aesthetically hides the sunroof-to-vehicle joints.

While the preferred embodiment of the powered dual panel sunroof has been disclosed, it will be appreciated that various other embodiments may be employed without departing from the present invention. For example, other drive and camming mechanisms may be used. Furthermore, tongue and groove fastening may be provided even though moving sunshades are not included. The disclosed tongue and groove arrangement can also be reversed between the front and rear tracks. Moreover, the modular unit may or may not include a dual sunroof arrangement. Various materials have been disclosed in an exemplary fashion, however, other materials may of course be employed. It is intended by the following claims to cover these and any other departures from the disclosed embodiments which fall within the true spirit of this invention.

The invention claimed is:

1. A sunroof assembly for an automotive vehicle, said sunroof assembly comprising:
   a substantially horizontal and fixed roof panel;
   a rear sunroof panel movable from a substantially horizontal open position beneath said fixed roof panel to a substantially horizontal closed position;
   a front sunroof panel movable from a substantially horizontal open position below said open position of said rear sunroof panel to a substantially horizontal closed position in front of said rear sunroof panel;
   a rear sunshade movable from a substantially horizontal open position below said open position of said rear sunroof panel to a substantially horizontal closed position below said closed position of said rear sunroof panel; and
   a front sunshade movable from a substantially horizontal open position below said open position of said front sunroof panel to a substantially horizontal closed position below said closed position of said front sunroof panel;
   said sunroof panels being movable mechanically independent of each other; and
   said sunshades being movable mechanically independent of each other.

2. The sunroof assembly of claim 1 wherein said rear sunroof panel is located higher in said automotive vehicle relative to said front sunroof panel when both are in said closed positions.

3. The sunroof assembly of claim 2 wherein said front sunroof panel is movable to a substantially horizontal intermediate position below said rear sunroof panel when said rear sunroof panel is disposed in said closed position.

4. The sunroof assembly of claim 1 further comprising:
   a front track having longitudinally oriented channels;
   a rear track having a longitudinally oriented channel;
   a front carriage riding within at least one of said channels of said front track;
   a rear carriage riding within said channel of said rear track;
   said front sunroof panel coupled to said front carriage;
   said rear sunroof panel coupled to said rear carriage; and
   at least one of said sunshades engaging with another of said channels of said front track.

5. The sunroof assembly of claim 4 wherein said channel of said rear track is disposed substantially outboard relative to said channels of said front track.

6. The sunroof assembly of claim 1 further comprising:
   a first pair of tracks stationarily affixed relative to said automotive vehicle, said front sunroof panel being movably coupled to said first pair of tracks; and
   a second pair of tracks stationarily affixed relative to said automotive vehicle, said rear sunroof panel being movably coupled to said second pair of tracks;
   said second pair of tracks being longitudinally shorter than said first pair of tracks, said pairs of tracks overlapping each other adjacent to a rear portion of said first pair of tracks, said second pair of tracks mounted to said first pair of tracks in an adjustable manner.

7. The sunroof assembly of claim 6 further comprising:
   first means for moving said front sunroof panel from said closed position to said open position;
   second means for moving said rear sunroof panel from said closed position to said open position; and
   at least one electric motor operably driving said first means for moving.

8. The sunroof assembly of claim 1 further comprising a stationary headliner disposed below said front sunshade when said front sunshade is in said open position, said sunroof panels being entirely hidden between said fixed roof panel and said headliner when said sunroof panels are disposed in said open positions, said front sunshade being disposed below said open position of said rear sunshade when said front sunshade is in said open position.

9. The sunroof assembly of claim 1 further comprising a raised and substantially rigid frame bordering at least two edges of said fixed roof panel, wherein said fixed roof panel is glass.

10. The sunroof assembly of claim 1 wherein said first and second sunroof panels are movable to pivoted venting positions.

11. A sunroof assembly for an automotive vehicle, said sunroof assembly comprising:
   a substantially horizontal and fixed roof panel;
   a rear sunroof panel movable from a substantially horizontal open position beneath said fixed roof panel to a substantially horizontal closed position;
   a front sunroof panel movable from a substantially horizontal open position below said open position of said rear sunroof panel to a substantially horizontal closed position in front of said rear sunroof panel;

said sunroof panels being movable mechanically independent of each other;

a front track having a longitudinally oriented channel, said front track having a substantially horizontal forward section and a rearward section declining from said forward section;

a rear track having a longitudinally oriented channel;

a front carriage riding in said channel of said front track; and a rear carriage riding in said channel of said rear track;

said front sunroof panel being coupled to said front carriage, said rear sunroof panel being coupled to said rear carriage;

said channel of said rear track being disposed substantially outboard relative to said channel of said front track; and said first and second sunroof panels being movable to pivoted venting positions.

12. A sunroof assembly for an automotive vehicle, said sunroof assembly comprising:

a first movable sunroof panel carrying member;

a second sunroof panel carrying member;

a first track having a channel for receiving said first movable sunroof panel carrying member;

a second track having a channel for receiving said second sunroof panel carrying member; and an adjustable fastening system allowing movement of said first track relative to said second track at least prior to fastening together said tracks, said fastening system including:

(a) a tongue projecting from said first track, said tongue extending substantially continuously between a front end and a rear end of said first track;

b) at least one leg projecting from said second track substantially parallel to said tongue, said leg extending substantially continuously between a front end and a rear end of said second track; and (c) a fastener securing said tongue to said leg when said tracks are disposed in their final desired position relative to each other for operation of said sunroof assembly.

13. The sunroof assembly of claim 12 wherein said second track includes:

a cable receiving cavity having a substantially circular cross sectional shape open toward said channel of said second track;

a substantially horizontal base substantially outwardly extending from said cavity, said base defining a bottom surface of said channel of said second track;

a pair of substantially L-shaped arms upwardly extending from said base, said arms having inwardly turned flanges substantially pointing toward said cavity, one of said arms defining another surface of said channel of said second track;

said second sunroof panel carrying member longitudinally riding in said channel of said second track; and a rear sunroof panel coupled to said second sunroof panel carrying member.

14. The sunroof assembly of claim 13 further comprising a front sunroof panel being coupled to said first sunroof panel carrying member, said first track including:

a cable receiving cavity having a substantially circular cross sectional shape accessible from said channel of said first track;

a base extending outward from said cavity in a substantially horizontal manner;

a pair of substantially L-shaped arms depending from said base; and one of said arms, said base and said cavity defining said channel of said first track;

said tongue extending upward from said base, said tongue being elongated in a longitudinal direction;

said first sunroof panel carrying member movably riding in a longitudinal direction in said channel of said first track.

15. The sunroof assembly of claim 12 wherein at least one of said tracks is substantially vertically movable relative to the other while portions of said tracks contact against each other prior to fastening of said first track to said second track, said tracks are located on the same crosscar side of said automotive vehicle.

16. A sunroof assembly comprising:

a first movable sunroof panel carrying member;

a second sunroof panel carrying member;

a first track having a channel operably receiving said first movable sunroof panel carrying member;

a second track having a channel operably receiving said second sunroof panel carrying member;

an adjustable fastening system operable to allow movement of said first track relative to said second track at least prior to fastening together said tracks;

a stationary cam mounted to said first track, a substantially L-shaped camming groove located in said stationary cam, said camming groove having a horizontal leg oriented substantially co-linear with said channel of said first track, said camming groove further having a substantially vertical leg upwardly extending from said substantially horizontal leg;

said first sunroof panel carrying member having a cam follower operably riding along said channel and said camming groove of said stationary cam;

a moving cam longitudinally moving in a second channel of said first track, said first sunroof panel carrying member having a second cam follower coupled to said moving cam;

a front sunroof panel coupled to said first sunroof panel carrying member; and an electric motor operably driving said moving cam along said second channel thereby causing said first sunroof panel carrying member to move said front sunroof panel between a closed position, a venting position and an open position.

17. A modular sunroof assembly for use in an automotive vehicle, said modular sunroof assembly comprising:

a sunroof tub;

sunroof panels movably attached to said tub; and a fixed outside roof panel installable in said automotive vehicle with said modular sunroof window assembly;

wherein said sunroof panels are movable from closed positions to open positions below said fixed outside roof panel.

18. The modular sunroof assembly of claim 17 wherein said stationary roof panel is glass.

19. The modular sunroof assembly of claim 17 wherein at least one of said sunroof panels can pivot to a venting position and linearly slide between said open and closed positions.

20. The modular sunroof assembly of claim 17 further comprising a spoiler attached to an exterior frame, wherein said exterior frame is mounted to said tub as a modular unit.

21. A modular sunroof assembly for use in an automotive vehicle, said modular sunroof assembly comprising:
   a sunroof tub;
   at least two sunroof panels movably attached to said tub;
   a fixed roof panel mounted to said tub; and
   a fixed spoiler disposed adjacent to an exterior and substantially rear portion of said fixed roof panel;
   wherein said tub, sunroof panels, fixed roof panel and said fixed spoiler are all operably installed in said automotive vehicle as a single modularized unit.

22. The sunroof assembly of claim 11 wherein a majority of said fixed roof panel is substantially transparent and a majority of said sunroof panels are substantially transparent.

23. The sunroof assembly of claim 11 further comprising a cam movably coupled to said front track, said front carriage having a member engaging said cam for operably pivoting said front sunroof panel.

* * * * *

UNITED STATES PATENT AND TRADEMARK OFFICE
CERTIFICATE OF CORRECTION

PATENT NO.     : 6,129,413
DATED          : October 10, 2000
INVENTOR(S)    : George W. Klein Page 1 of 1

It is certified that error appears in the above-identified patent and that said Letters Patent is hereby corrected as shown below:

Column 4,
Lines 7 and 8, "Sunroof" on line 7 should be on line 9.
"Shade" on line 8, should be on line 10.

Column 5,
Line 24, delete "7".

Signed and Sealed this

Sixth Day of November, 2001

Attest:

*Nicholas P. Godici*

NICHOLAS P. GODICI
*Attesting Officer*   *Acting Director of the United States Patent and Trademark Office*